US012380422B2

(12) United States Patent
Vyas

(10) Patent No.: US 12,380,422 B2
(45) Date of Patent: Aug. 5, 2025

(54) METHODS AND SYSTEMS FOR CONTACTLESS TRANSMISSION OF TRANSACTIONAL INFORMATION

(71) Applicant: PAYPAL, INC., San Jose, CA (US)

(72) Inventor: Adhish N. Vyas, Gilroy, CA (US)

(73) Assignee: PAYPAL, INC., San Jose, CA (US)

( * ) Notice: Subject to any disclaimer, the term of this patent is extended or adjusted under 35 U.S.C. 154(b) by 0 days.

(21) Appl. No.: 18/493,518

(22) Filed: Oct. 24, 2023

(65) Prior Publication Data

US 2024/0152897 A1 May 9, 2024

Related U.S. Application Data

(63) Continuation of application No. 17/588,977, filed on Jan. 31, 2022, now Pat. No. 11,823,169, which is a continuation of application No. 16/934,896, filed on Jul. 21, 2020, now Pat. No. 11,315,102, which is a continuation of application No. 15/091,630, filed on Apr. 6, 2016, now Pat. No. 10,719,822.

(51) Int. Cl.
*G06Q 20/32* (2012.01)
*G06K 7/00* (2006.01)
*G06K 19/06* (2006.01)
*G06Q 20/40* (2012.01)

(52) U.S. Cl.
CPC ....... *G06Q 20/3224* (2013.01); *G06K 7/0004* (2013.01); *G06K 19/06206* (2013.01); *G06Q 20/3278* (2013.01); *G06Q 20/40145* (2013.01)

(58) Field of Classification Search
CPC .......... G06Q 20/3224; G06Q 20/3278; G06Q 20/40145; G06K 7/0004; G06K 19/06206

USPC ..................................................... 705/35–45
See application file for complete search history.

(56) References Cited

U.S. PATENT DOCUMENTS

| 4,280,037 | A | 7/1981 | Schmidhauser |
| 7,857,212 | B1 | 12/2010 | Matthews |
| 2007/0174082 | A1* | 7/2007 | Singh ............... H04W 4/02 705/44 |
| 2010/0179907 | A1 | 7/2010 | Atkinson |

(Continued)

FOREIGN PATENT DOCUMENTS

WO 2015026184 A1 2/2015

*Primary Examiner* — Robert R Niquette
(74) *Attorney, Agent, or Firm* — HAYNES AND BOONE, LLP

(57) ABSTRACT

Embodiments described herein disclose a mobile device system for displaying contactless payment options to a user of a mobile device. A location of the device may be detected. The location may be transmitted to a payment services provider, and information indicating that the location corresponds to a merchant having contactless payment options may be received. In response, graphical depictions of payment options associated with a plurality of payment sources are displayed on a touch-sensitive display of the mobile device. A selection of one of the graphical depictions is received, and in response, one or more transceivers of the mobile device, such as one or more NFC transceivers, may be activated. The activation may cause the transceivers to transmit a personal account number to a point-of-sale terminal. Thus, the user is presented with contactless payment options based on a geographical location, and may be presented with a suggested payment source.

19 Claims, 10 Drawing Sheets

(56) References Cited

U.S. PATENT DOCUMENTS

| | | |
|---|---|---|
| 2012/0290472 A1 | 11/2012 | Mullen |
| 2012/0296818 A1 | 11/2012 | Nuzzi |
| 2013/0124319 A1* | 5/2013 | Hodge .................. G06Q 20/10 705/14.54 |
| 2013/0290176 A1* | 10/2013 | Tirumalashetty .. G06Q 30/0633 705/40 |
| 2014/0236810 A1* | 8/2014 | Ramchandran ........ G06Q 20/22 705/39 |
| 2014/0279509 A1 | 9/2014 | Khilnani |
| 2014/0344157 A1 | 11/2014 | Suitner |
| 2015/0039511 A1 | 2/2015 | Genovez |
| 2015/0332245 A1* | 11/2015 | Meyer .................... G06Q 30/06 705/39 |
| 2017/0098210 A1* | 4/2017 | Laracey ............... G06Q 20/327 |
| 2017/0221085 A1* | 8/2017 | Ghosh ................ G06Q 30/0205 |
| 2018/0232718 A1* | 8/2018 | Brown ................ G06Q 20/363 |
| 2024/0152897 A1* | 5/2024 | Vyas .................. G06Q 20/3224 |

\* cited by examiner

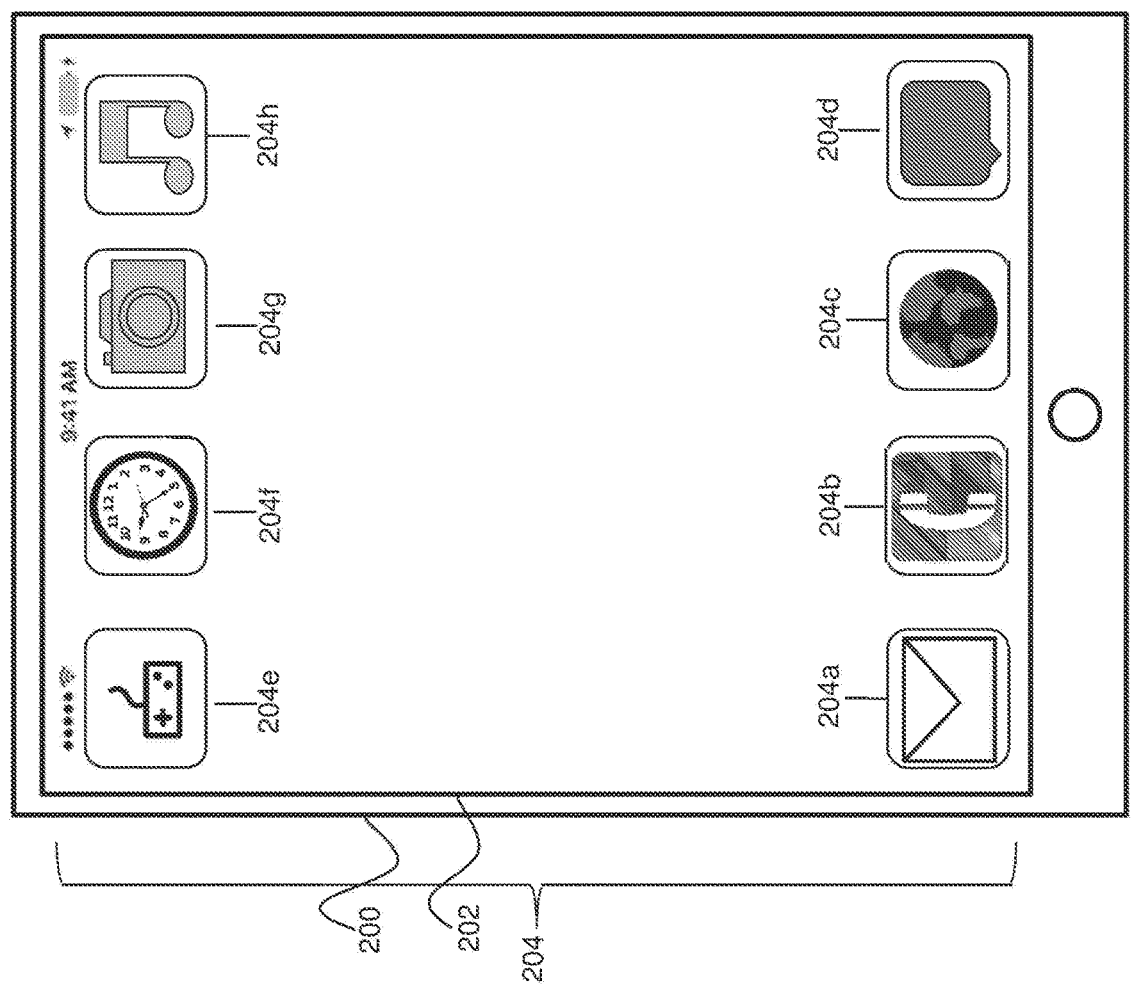

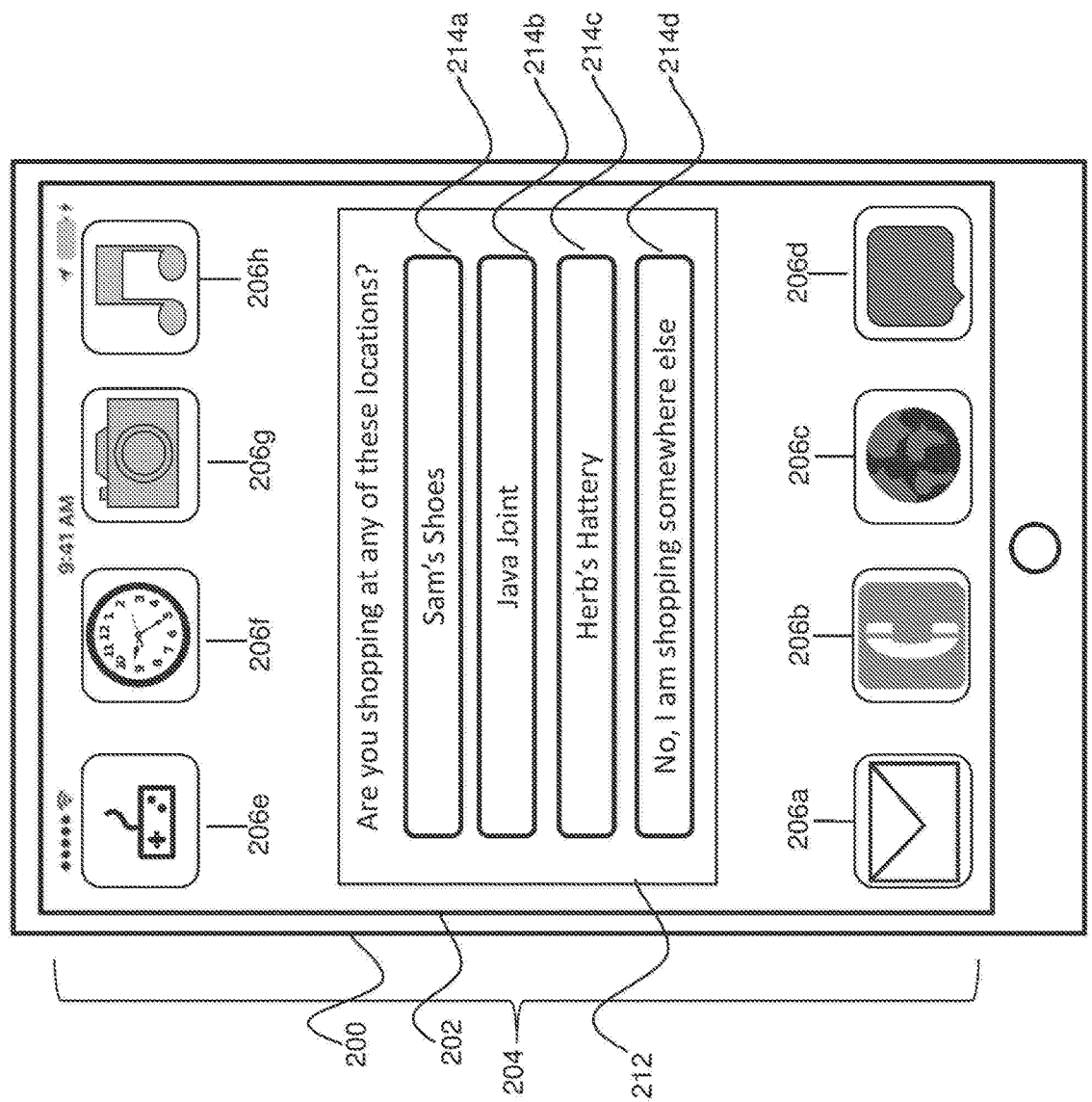

METHODS AND SYSTEMS FOR CONTACTLESS TRANSMISSION OF TRANSACTIONAL INFORMATION

CROSS REFERENCE TO RELATED APPLICATIONS

This application is a continuation of U.S. patent application Ser. No. 17/588,977, filed Jan. 31, 2022, which is a continuation of U.S. patent application Ser. No. 16/934,896, filed Jul. 21, 2020, and issued on Apr. 26, 2022, as U.S. Pat. No. 11,315,102 which is a continuation of U.S. patent application Ser. No. 15/091,630, filed Apr. 6, 2016, and issued on Jul. 21, 2020, as U.S. Pat. No. 10,719,822, the disclosures of each which have been hereby incorporated by reference in their respective entireties.

BACKGROUND

Field

The present disclosure generally relates to point-of-sale interactions conducted between a payment terminal and a mobile device and more particularly to a system and method that provides graphical user interface access to contactless payment methods.

Related Art

More and more consumers are conducting transactions, such as searching for and purchasing, items and services over electronic networks such as, for example, the Internet. Consumers routinely purchase products and services from merchants and individuals alike. The transactions may take place directly between a conventional or on-line merchant or retailer and the consumer, and payment is typically made by entering credit card or other financial information. Transactions may also take place with the aid of an on-line or mobile payment services provider such as, for example, PayPal, Inc. of San Jose, CA. Such payment services providers can make transactions easier and safer for the parties involved. Purchasing with the assistance of a payment services provider from the convenience of virtually anywhere using a mobile device is one main reason why on-line and mobile purchases are growing very quickly.

Additionally, many consumers may use applications provided by payment services providers to make purchases at traditional, brick-and-mortar establishments. Such applications may provide contactless payment methods, such as near field communication (NFC) or magnetic stripe emulation payment methods. Using these applications may permit the consumer to eliminate the need to carry currency or credit cards, and may provide the user with the ability to pay for in-store transactions using only their mobile device. Accessing these payment methods through such applications may be cumbersome and not intuitive.

Thus, there is a need for an improved system and method for user interface features for presenting contactless payment methods to a user of a mobile device.

BRIEF DESCRIPTION OF THE FIGURES

FIG. 2a is a front view illustrating an embodiment of a touch-sensitive display device on a payer device displaying a home screen of a mobile device operating system;

FIG. 2c is a front view illustrating an embodiment of a touch-sensitive display device on a payer device displaying a home screen of a mobile device operating system with a pop-up window requesting an input from a user of the mobile device to confirm a detected location;

Figure 1:
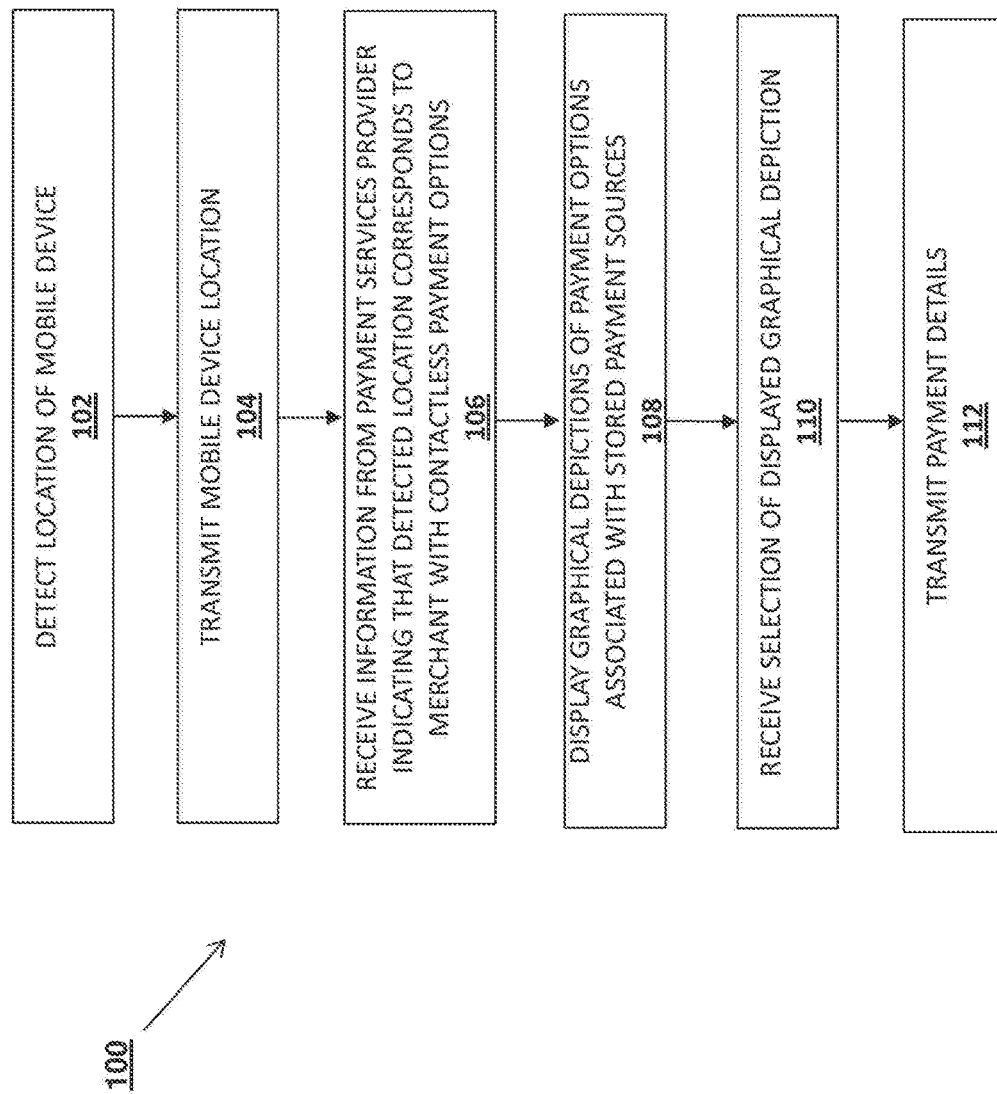
FIG. 1 is a flow chart illustrating an embodiment of a method for presenting payment options on a graphical user interface of a mobile device having a touch-sensitive display device.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure provides, according to one embodiment, a system and method for providing, by an application or operating system executing on a mobile device system, graphical depictions of contactless payment options in a convenient manner to a user at a time when the user is likely to require such contactless payment options. The application or operating system may be executed by a mobile device system having location detection sensors, such as GPS location sensors, one or more near field communications or other transceivers, and a touch-sensitive display device. A location of the mobile device may be detected using the location sensors. The detected location may be transmitted to a payment services provider. Information from the payment services provider indicating that the detected location of the mobile device corresponds to a merchant having contactless payment options available to consumers is received. On the touch-sensitive display, one or more graphical depictions of payment options associated with the stored plurality of payment sources are displayed. A selection of one of the displayed graphical depictions of payment options may be received using the touch-sensitive display. In response, the hardware processors of the mobile device system may activate the one or more near field communications transceivers or provide other contactless payment facilities, which may cause the transceivers to transmit a personal account number associated with the selected graphical depiction. As such, a user may be presented with contactless payment sources in an easily accessed widget or icon interface based on his or her location, and may select a contactless payment source to transmit a personal account number to a merchant point-of-sale system to complete a transaction.

Referring now to FIG. 1, an embodiment of a method 100 for presenting payment options on a graphical user interface of a mobile device having a touch-sensitive display device is described. In the embodiments and examples discussed below, system functionality may be realized by an application provided by a payment services provider that may provide a user wallet functionality that allows the user to save one or more payment sources, payment instruments or other methods of payment, make payments to online and/or offline (e.g., brick-and-mortar) merchants using those payment instrument(s), transfer money to other users using those payment instrument(s), and/or provide other wallet functionality known in the art. However, the functionality described with respect to the embodiments disclosed herein is not limited to the aforementioned wallet functionality provided by the payment services provider, and instead may be implemented in other applications and uses such as, for example, an operating system, an operating system extension, a web browser, mapping applications, and/or other applications executed by a mobile device having a touch-sensitive display device.

Referring first to FIG. 2a, a payer device 200 or mobile device includes a display 202 displaying a home screen 204 of a mobile device operating system, such as an iOS or Android mobile device operating system. In one embodiment, the functionality described with respect to the embodiments disclosed herein is executed by a payment application running in the background of a mobile device operating system. The payment application may be provided by a payment services provider, such as PayPal Inc. of San Jose, CA, and the payer associated with the payer device may have a payment account with the payment services provider that allows the payer to access one or more financial accounts or payment sources for making payments to merchants or other users (e.g., credit card financial accounts, banking financial accounts, virtual currency financial accounts, etc.). The display 202 is a touch-sensitive or gesture-detecting display device, and may include multi-touch display device functionality that is capable of detecting multiple inputs at once from a user. Wallet functionality of the payment application may provide various functions, for example, the wallet functionality may provide storage for financial accounts or payment sources associated with the user's account information, such as an account with the payment services provider, one or more credit card accounts, one or more virtual currency financial accounts, and one or more bank accounts. The wallet functionality may also include functionality to allow the user to add a new account, funding source, or payment source, such as a credit card, debit card, store loyalty card, gift card, bank account, virtual currency account, or other financial account to the user's account with the payment services provider. Such wallet functionality may also be integrated into the mobile device operating system itself. Display 202 displaying the home screen 204 of the mobile device operating system may also include one or more graphical user interface icons 206a-206f. Such graphical user interface icons 206a-206f may be selected by a user to launch an associated application, such as an e-mail application, phone application, web browser application, messaging application, social networking application, mapping application, or other such applications. As shown in FIG. 2a, the graphical user interface icons 206a-206f may be displayed at various locations on the home screen 204 of display 202.

The method 100 begins at block 102 where a location of a mobile device is detected. In one embodiment, the location of the mobile device may be detected by one or more location sensors, such as global positioning satellite (GPS) receivers included in a mobile device. In one embodiment, additional location detection sensors are used to detect the location of the mobile device. For example, the mobile device may utilize Wi-Fi triangulation to estimate the location of the mobile device, or may use information from cellular towers to estimate the location of the mobile device. In one embodiment, information from multiple location sensors may be used to increase the accuracy in determining the location of the mobile device. In one embodiment, location beacons, such as Bluetooth location beacons, may be used to increase the accuracy in determining the location of the mobile device. In one embodiment, the detection of the location may also include detection of an application executing on the mobile device, such as a shopping application.

The method 100 then proceeds to block 104 where the detected location of the mobile device is transmitted to a payment services provider. In one embodiment, the location is transmitted over a mobile network to a mobile services provider, and then to the payment services provider, via the Internet.

The method 100 then proceeds to block 106, where information from the payment services provider is received. In one embodiment, the information received from the payment services provider includes information indicating that the detected location corresponds to a merchant corresponding to or in the proximity of the detected location of the mobile device. Further, the information received from the payment services provider may include information indicating that the merchant at the detected location has contactless payment options available to consumers. The term "contactless payment option" as used herein indicates a payment option that does not require a physical swipe or exchange of a payment mechanism, e.g., a contactless payment option is one in which a credit card does not need to be swiped at a payment terminal. In one embodiment, the determination that at method 106 includes a determination that the merchant may accept payments for a transaction using a barcode-based payment system. For example, some contactless payment systems generate a single-use barcode to be displayed on a mobile device of a user. The barcode is scanned by the point-of-sale barcode scanner to transmit payment details for the transaction. In one embodiment, another contactless payment option may include the ability for a merchant to accept near field communications based payments. For example, certain mobile telephones are sold with near field communications transceivers which securely transmit payment details for a transaction from the mobile device to a near field communications equipped point-of-sale terminal (e.g., a credit card terminal with a near field communications reader or transceiver). Thus, the determination at block 106 may include a determination that the merchant has a near field communications equipped point-of-sale terminal. In one embodiment, another contactless payment option may include the ability for a merchant to accept credit card payments using a magnetic stripe emulation technology. For example, certain point-of-sale credit card readers can receive a signal generated by a magnetic stripe emulator in a mobile device which transmits payment details to the credit card reader. The credit card reader treats the magnetic stripe emulation as a "swipe" of the credit card.

In one embodiment, the merchant is identified by the payment services provider. In one embodiment, the merchant is identified by the mobile device of the user. In a further embodiment, the identification may be based on a combination of the merchant and the mobile device. For example, the payment services provider may identify a merchant corresponding to the detected location of the mobile device. The user may then be presented with a confirmation screen on a touch-sensitive display device to confirm whether the payment services provider's identification of the merchant corresponding to the detected location of the mobile device is correct. In one embodiment, the user may be presented with a list of potential merchants corresponding to the detected location of the mobile device, and may be asked to select a correct merchant using a display on a touch-sensitive display device of the mobile device. In one embodiment, the user may be asked to type in or search for the merchant corresponding to the detected location of the mobile device.

Figure 2B:
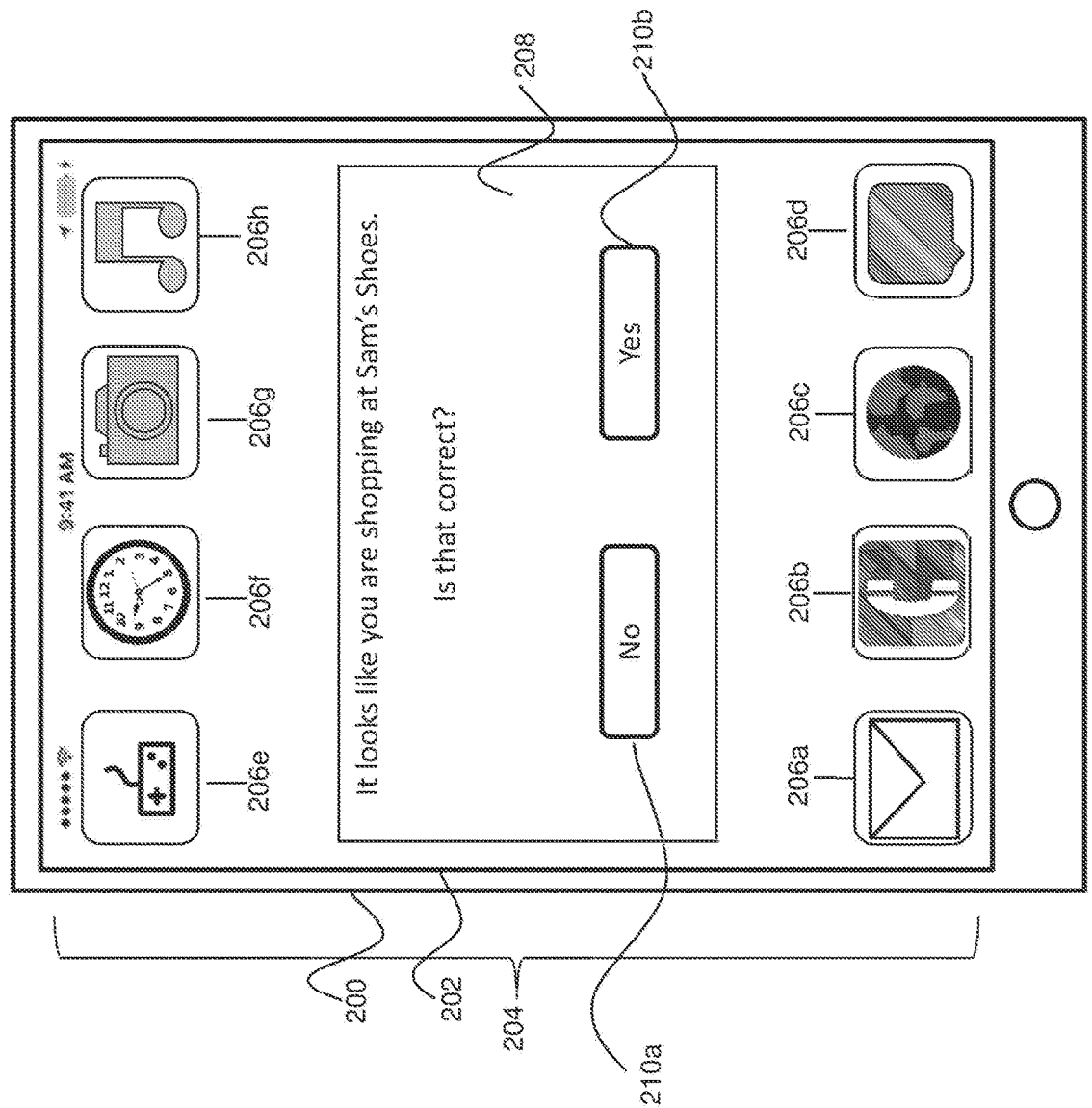
FIG. 2b is a front view illustrating an embodiment of a touch-sensitive display device on a payer device displaying a home screen of a mobile device operating system with a pop-up window requesting an input from a user of the mobile device.

Referring now to FIG. 2b, the application may detect the location of the mobile device, and receive an identification of a merchant corresponding to the location from the payment services provider, or determine the merchant corresponding to the location within the application itself. Accordingly, the user may be presented with information such as that depicted in the display illustrated in FIG. 2b. The display of FIG. 2b includes a window 208, such as a pop-up window, informing the user that it appears the user is shopping at a detected location of Sam's Shoes, and providing buttons 210a and 210b, which may be selected by the user to either confirm the identified merchant (button 210b) or reject the identified merchant (button 210a). The user may interact with the touch-sensitive display device 202 to select either button 210a or 210b.

Referring now to FIG. 2c, in one embodiment described above, the application may detect the location of the mobile device, and receive an identification of multiple possible merchants corresponding to the location from the payment services provider or based on its own determination. For example, in a shopping mall, multiple merchants may be in close proximity, and detected location information may match multiple merchants. Accordingly, the user may be presented with the display illustrated in FIG. 2c. The display of FIG. 2c includes a window 212 presenting the user with three options with corresponding buttons 214a-214c, requesting that the user confirm he or she is shopping at one of the three options. Further, the window 212 presents the user with a fourth option with a corresponding button 214d for selection by the user if none of the displayed options correspond to the merchant where the user is shopping. The user may interact with the touch-sensitive display device 202 to select any of buttons 214a-214d, depending on the merchant where the user is shopping.

In one embodiment, if the identification of the merchant includes receiving input from the user confirming a merchant identification, the identification of the merchant may be transmitted to the payment service provider to determine whether the identified merchant has contactless payment options available to consumers.

The method 100 then proceeds to block 108, where the mobile device displays on a touch-sensitive display device one or more graphical depictions of payment options associated with a stored plurality of payment sources. In one embodiment, the display is caused by an application executing on the mobile device. In one embodiment, the display is caused by the mobile device operating system executing on the mobile device. Further, the display may be caused by a combination of the application and the mobile device operating system (e.g., the application may be running in the background or as an extension to the mobile device operating system). In one embodiment, a non-transitory memory of the mobile device may store a plurality of payment sources (e.g., credit cards, virtual currency sources, etc.) associated with a user of the mobile device. In one embodiment, each payment source may be associated with a personal account number. Thus, for example, instead of a mobile device storing a user's actual credit card number, the payment service provider may communicate with a credit card issuer or other service to generate or receive a unique token or personal account number to be stored in the user's mobile device. In this way, if the user's mobile device is lost, stolen, or otherwise compromised, the user's credit card number is not vulnerable; only the associated personal account number may be stored on the mobile device. The personal account number can be cancelled at any time and a new personal account number can be generated to ensure security.

Figure 2D:
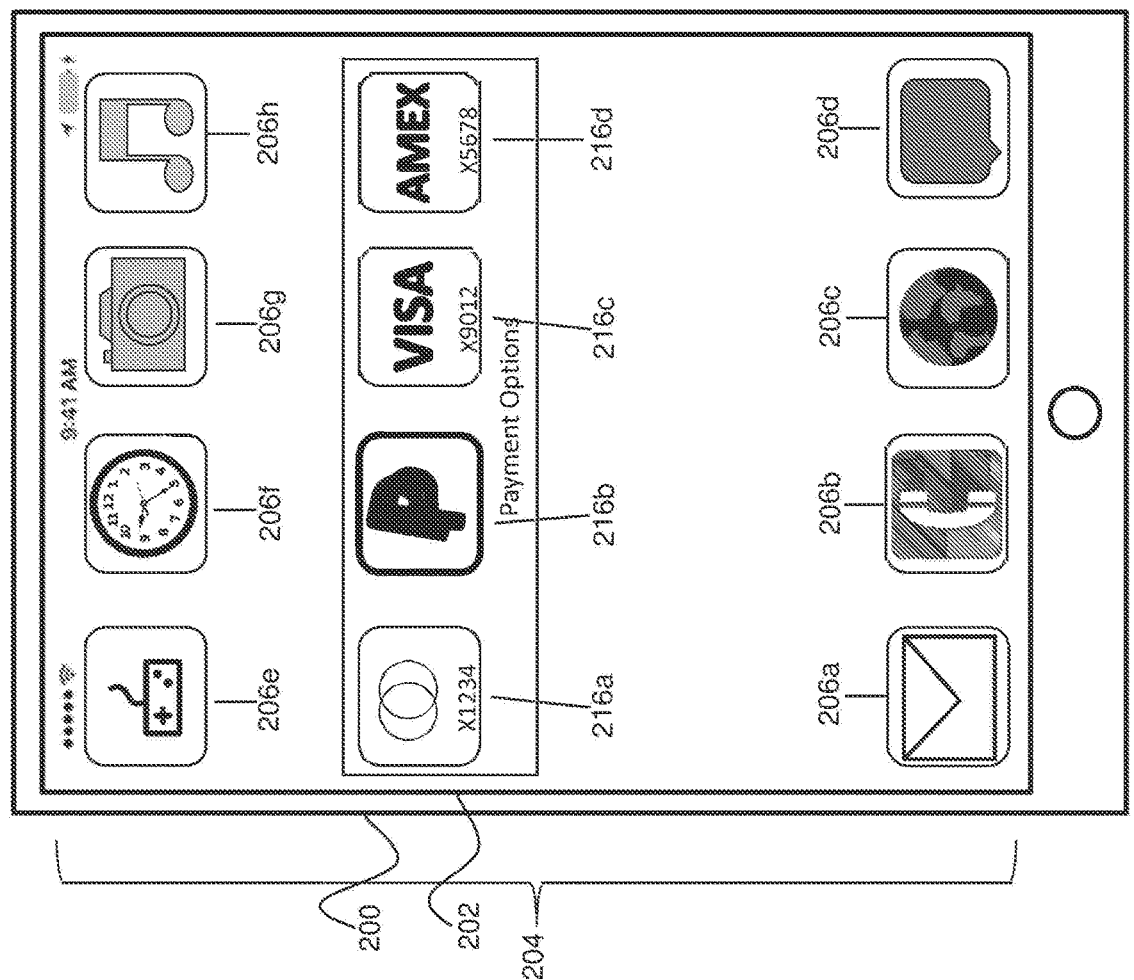
FIG. 2d is a front view illustrating an embodiment of a touch-sensitive display device on a payer device displaying a home screen of a mobile device operating system with a plurality of graphical depictions of payment sources.

Referring now to FIG. 2d, the application executing on the mobile device 200, or the operating system executing on the mobile device 200, may provide the display of the one or more graphical depictions (e.g., icons) of payment options associated with the stored plurality of payment sources. For example, the display of FIG. 2d depicts four icons 216a-216d representing stored payment sources associated with the user. In one embodiment, each icon includes graphical and text information corresponding to the payment option (e.g., a logo for the credit card issuer or payment services provider, the last four digits of the credit card corresponding to the payment option, etc.) Each icon 216a-216d may be selected by the user to transmit payment details for a transaction with the merchant. The user may interact with the touch-sensitive display device 206 to select an icon 216a-216. Note that icons may be displayed on different screens of display device 206, e.g., on a lock screen, on a home screen, or any other screen currently in use by the user when the mobile device is detected the occurrence of a possible payment transaction or event.

The method 100 then proceeds to block 110, where a selection of one of the displayed graphical depictions of payment options is received using the touch-sensitive display. For example, as described above, the user may interact with touch-sensitive display device 206 to select icon 216b to pay for the transaction with the merchant.

The method 100 then proceeds to block 112, where the payment details are transmitted. In one embodiment, if the merchant accepts near field communications payments and the selected payment option is a near field communications payment method, one or more near field communications transceivers in the mobile device may be activated by the hardware processors of the mobile device. The activation may cause the one or more near field communications transceivers to transmit a personal account number associated with the selected graphical depiction. In one embodiment, if the merchant accepts payments by scanning a barcode, the hardware processors in the mobile device may generate a barcode corresponding to the selected payment option for display on the touch-sensitive display device, and the user may allow the barcode to be scanned to transmit payment details. In one embodiment, if the merchant accepts credit cards, the selection of the graphical depiction of the payment option may cause the processors of the mobile device to activate a magnetic stripe emulator device in the mobile device, at which point the user can transmit credit card details to the merchant by placing the mobile device near the credit card terminal.

In one embodiment, prior to transmitting payment details, the application executing on the mobile device or the operating system of the mobile device may require that the payment be authenticated. In one embodiment, such authentication may be provided by a passcode or password entered by the user. In one embodiment, such authentication may be provided biometrically. Thus, for example, if a mobile device includes a biometric authentication sensor (e.g., fingerprint reader), the user may place a finger on the biometric authentication sensor to cause the mobile device to receive a biometric authentication request. Responsive to a positive biometric authentication by the mobile device, the mobile device may cause the contactless payment details to be transmitted (e.g., by activating a near field communications transceiver, generating a barcode, or emulating a magnetic stripe swipe). In one embodiment, an authentication process may occur before a user unlocks a mobile device, for example, when a lock screen is displayed on the mobile device. In one embodiment, an authentication process may occur after the user has unlocked the mobile device, and is performed before the user authenticates through, for example, a payment service provider. In one embodiment, the authentication process may be an additional level of security after the user authenticates through a payment services provider. Other user-specific authentication methods are contemplated as well, for example, voice recognition or facial recognition may be used to authenticate with the mobile device or payment services provider.

In one embodiment, characteristics of the merchant and promotions may be received from the payment services provider. The promotions may be offered by the merchant or may be offered by an entity associated with a stored payment source. In response, the mobile device may determine based on such information a suggested payment source for a transaction between the merchant and the user of the mobile device. Thus, an emphasized graphical depiction of a payment option associated with the suggested payment source may be displayed on the graphical user interface of the mobile device. For example, the suggested payment source may be displayed with an outline (as with payment option 216*b* of FIG. 2*d*), or placed first in an order of payment sources, etc.

Thus, for example, in one embodiment, information received from the payment services provider for a merchant may also include a merchant categorization. For example, certain credit cards offer different rewards or incentives based on the category of the merchant. As one example, a credit card may offer 5% cash back for use at a gas station, 3% cash back for use at grocery stores, and 1% cash back for use at all other merchants. In one embodiment, the promotions may be offered by an entity associated with a payment source stored in the application or operating system on the mobile device of the user. For example, promotions offered by an entity associated with a payment source may include reward points offered by a credit card issuing bank. As one example, a credit card issuing bank may offer consumers having a particular credit card a fixed number of airline miles per dollar spent using that credit card. In one embodiment, the promotions may be offered by the merchant corresponding to the detected location of the mobile device. For example, the merchant may offer a discount for using a particular payment method. As one example, the merchant may offer a 2% discount if a consumer pays using a debit card instead of a credit card, as the merchant may not need to pay the credit card processor fees for the transaction, and may pass that savings along to the consumer. In one embodiment, such promotions are not known by consumers (i.e., the offers are non-public), but are known only to the payment services provider or the credit card issuing banks or other institutions, and the consumer is only informed of such promotions at or near the time of payment. Other promotions or promotional offers may be provided to the user as well.

In one embodiment, promotions may be received from the payment services provider, which may in turn receive the promotions from the entity (e.g., credit card issuing bank) associated with a payment source. For example, in one embodiment, the payment services provider may transmit to the issuing bank an indication of a likely transaction between a user and a particular merchant, and may transmit to the issuing bank certain details of the transaction, such as the amount of the transaction, the merchant corresponding to the transaction, or the items to be purchased in the transaction. The issuing bank may choose to offer that user a special promotion to entice the user to use its credit card over other payment sources. For example, the issuing bank may offer that user a promotion that is not currently active for other customers, but which may help the issuing bank's likelihood that its credit card is used for the transaction. In one embodiment, the details transmitted from the payment services provider include no identifying information of the user. In one embodiment, the details transmitted from the payment services provider include identifying information of the user, so that the entity or issuing bank can target promotions to individual customers. In certain embodiments, the consumer must opt-in to such targeting.

In one embodiment, the payment services provider may receive promotions, including non-public promotions, from an entity associated with a payment source, such as a credit card issuing bank, on a periodic basis. In one embodiment, the payment services provider and entity associated with the payment source may collaborate on a standardized data protocol to exchange promotion information, using, for example, extensible markup language (XML) or another data format. The information received may instruct the payment services provider to offer a particular promotion to a certain percentage of users, and may allow the payment services provider to determine which users are offered the promotion. In one embodiment, as described above, such promotions are non-public promotions not known to users or consumers, but maintained by the payment services provider or entity associated with the payment source, and are only offered for limited time periods to users matching the desired criteria at the time of payment, or as an incentive to pay with a certain payment source.

Thus, a suggested contactless payment source for the transaction between the merchant and the user of the mobile device may be determined. In one embodiment, the suggested payment source is determined by the application executing on the mobile device or by the operating system of the mobile device. In one embodiment, the suggested payment source may be determined by the payment services provider. In one embodiment, the suggested payment source is determined based on one or more stored payment sources, the characteristics of the merchant, and the one or more promotions, including one or more promotions provided by an entity associated with a payment source which is not publicly available (i.e., non-public promotions). As one example, the merchant may be a grocery store, and the payment source determined may be a grocery store credit card which offers 2% back on grocery purchases, with an extra 1% cash back to a particular class of users or individual users sharing a characteristic desired by an entity associated with the payment source. In one embodiment, additional information is used to determine the suggested payment source for the transaction. For example, details of the transaction, such as an amount of the transaction, the items purchased in the transaction, and other information, may be used to determine the suggested payment source. In one embodiment, a payment services provider device or the mobile device of the user may store data to be used in the determination of suggested payment sources for presentation to users of the payment application.

In one embodiment, the location detection sensors of the mobile device may detect a second location of the mobile device. The second location may represent a change in location from the first location. The second location may be transmitted to the payment services provider. In response, information may be received from the payment services provider indicating that the second detected location does not correspond to a merchant having contactless payment options available to consumers. Thus, the one or more graphical depictions of payment options associated with the plurality of payment sources may be removed from display. Thus, for example, the display of FIG. 2d may return to the display of FIG. 2a. In one embodiment, the one or more graphical depictions of payment options associated with the plurality of payment sources may also be removed from display responsive to a receipt of an indication of a successful transaction. The indication of the successful transaction may be received by, for example, the NFC transceiver.

In one embodiment, only graphical depictions of payment options which are accepted by the identified merchant are displayed. Thus, for example, if the user has NFC-based payment options, magnetic stripe emulation payment options, and barcode payment options, but the particular merchant only accepts barcode payments, only those payment options may be displayed with graphical depictions on the touch-sensitive display of the mobile device. In one embodiment, the graphical depictions of the payment options may be displayed in an order based on preferences of the user of the mobile device.

Thus, systems and methods have been described that provide for the presentation of contactless payment sources using a graphical user interface. The systems and methods may detect a location of a mobile device, and present graphical depictions of payment options associated with a stored plurality of payment sources. One or more of the presented graphical depictions may be a particular payment source recommended for a particular transaction. In response to a selection of a graphical depiction, such as an icon, a transceiver may transmit payment details to a point-of-sale terminal. As such, the presentation recommendation of payment sources and display of graphical depictions assists the user in the selection of contactless payment options and may assist the user in selecting optimal payment sources for a transaction.

Figure 3:
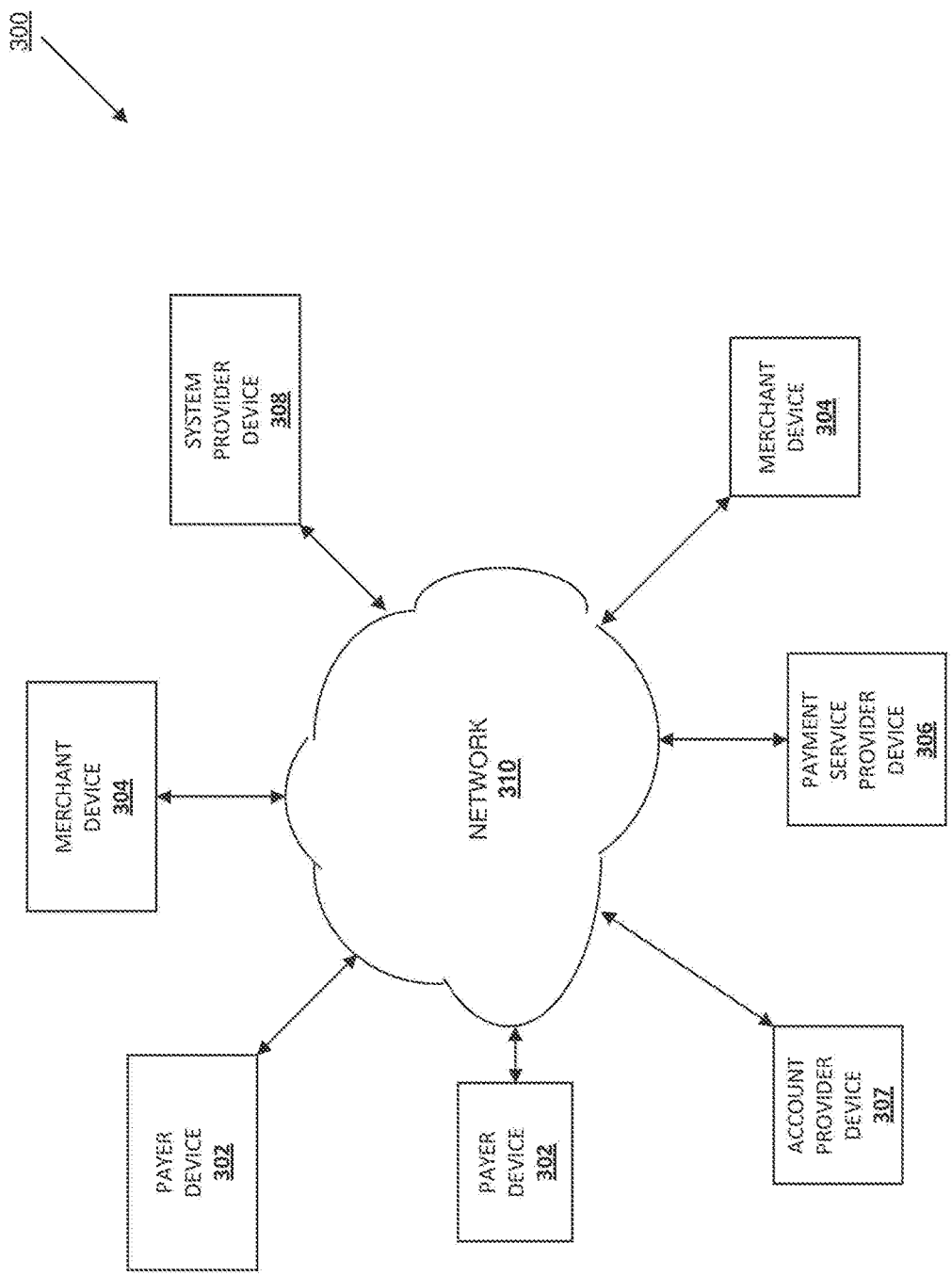
FIG. 3 is a schematic view illustrating an embodiment of a networked system.

Referring now to FIG. 3, an embodiment of a network-based system 300 for implementing one or more processes described herein is illustrated. As shown, network-based system 300 may comprise or implement a plurality of servers and/or software components that operate to perform various methodologies in accordance with the described embodiments. Exemplary servers may include, for example, stand-alone and enterprise-class servers operating a server OS such as a MICROSOFT® OS, a UNIX® OS, a LINUX® OS, or other suitable server-based OS. It can be appreciated that the servers illustrated in FIG. 3 may be deployed in other ways and that the operations performed and/or the services provided by such servers may be combined or separated for a given implementation and may be performed by a greater number or fewer number of servers. One or more servers may be operated and/or maintained by the same or different entities.

The embodiment of the networked system 300 illustrated in FIG. 3 includes a plurality of payer devices 302, a plurality of merchant devices 304, a payment services provider device 306, an account provider device 307, and/or a system provider device 308, in communication over a network 310. Any of the payer devices 302 may be the payer device 200 operated by the users, discussed above. The merchant devices 304 may be the merchant devices discussed above and may be operated by the merchants discussed above. The payment services provider device 306 may be the payment services provider devices discussed above and may be operated by a payment services provider such as, for example, PayPal Inc. of San Jose, CA. The account provider devices 307 may be the account provider devices discussed above and may be operated by the account providers discussed above such as, for example, credit card account providers, bank account providers, savings account providers, and a variety of other account providers known in the art. The system provider device 308 may be one of the system provider devices discussed above and may be operated by one or more of the system providers discussed above.

The payer devices 302, merchant devices 304, payment services provider device 306, account provider device 308, and/or system provider device 308 may each include one or more processors, memories, and other appropriate components for executing instructions such as program code and/or data stored on one or more computer readable mediums to implement the various applications, data, and steps described herein. For example, such instructions may be stored in one or more computer readable mediums such as memories or data storage devices internal and/or external to various components of the system 300, and/or accessible over the network 310.

The network 310 may be implemented as a single network or a combination of multiple networks. For example, in various embodiments, the network 310 may include the Internet and/or one or more intranets, landline networks, wireless networks, and/or other appropriate types of networks.

The payer device 302 may be implemented using any appropriate combination of hardware and/or software configured for wired and/or wireless communication over network 310. For example, in one embodiment, the payer device 302 may be implemented as a personal computer of a user in communication with the Internet. In other embodiments, the payer device 302 may be a smart phone, personal digital assistant (PDA), laptop computer, and/or other types of computing devices.

The payer device 302 may include one or more browser applications which may be used, for example, to provide a convenient interface to permit the payer to browse information available over the network 310. For example, in one embodiment, the browser application may be implemented as a web browser configured to view information available over the Internet.

The payer device 302 may also include one or more toolbar applications which may be used, for example, to provide user-side processing for performing desired tasks in response to operations selected by the payer. In one embodiment, the toolbar application may display a user interface in connection with the browser application.

The payer device 302 may further include other applications as may be desired in particular embodiments to provide desired features to the payer device 302. In particular, the other applications may include a payment application for payments assisted by a payment services provider through the payment services provider device 306. The other applications may also include security applications for implementing user-side security features, programmatic user applications for interfacing with appropriate application programming interfaces (APIs) over the network 310, or other types of applications. Email and/or text applications may also be included, which allow the payer to send and receive emails and/or text messages through the network 310. The payer device 302 includes one or more user and/or device identifiers which may be implemented, for example, as operating system registry entries, cookies associated with the browser application, identifiers associated with hardware of the payer device 302, or other appropriate identifiers, such as a phone number. In one embodiment, the user identifier may be used by the payment services provider device 306 and/or account provider device 307 to associate the user with a particular account as further described herein.

The merchant device 304 may be maintained, for example, by a conventional or on-line merchant, conventional or digital goods seller, individual seller, and/or application developer offering various products and/or services in exchange for payment to be received conventionally or over the network 310. In this regard, the merchant device 304 may include a database identifying available products and/or services (e.g., collectively referred to as items) which may be made available for viewing and purchase by the payer.

The merchant device 304 also includes a checkout application which may be configured to facilitate the purchase by the payer of items. The checkout application may be configured to accept payment information from the user through the payer device 302, the account provider through the account provider device 307, and/or from the payment services provider through the payment services provider device 306 over the network 310.

Figure 4:
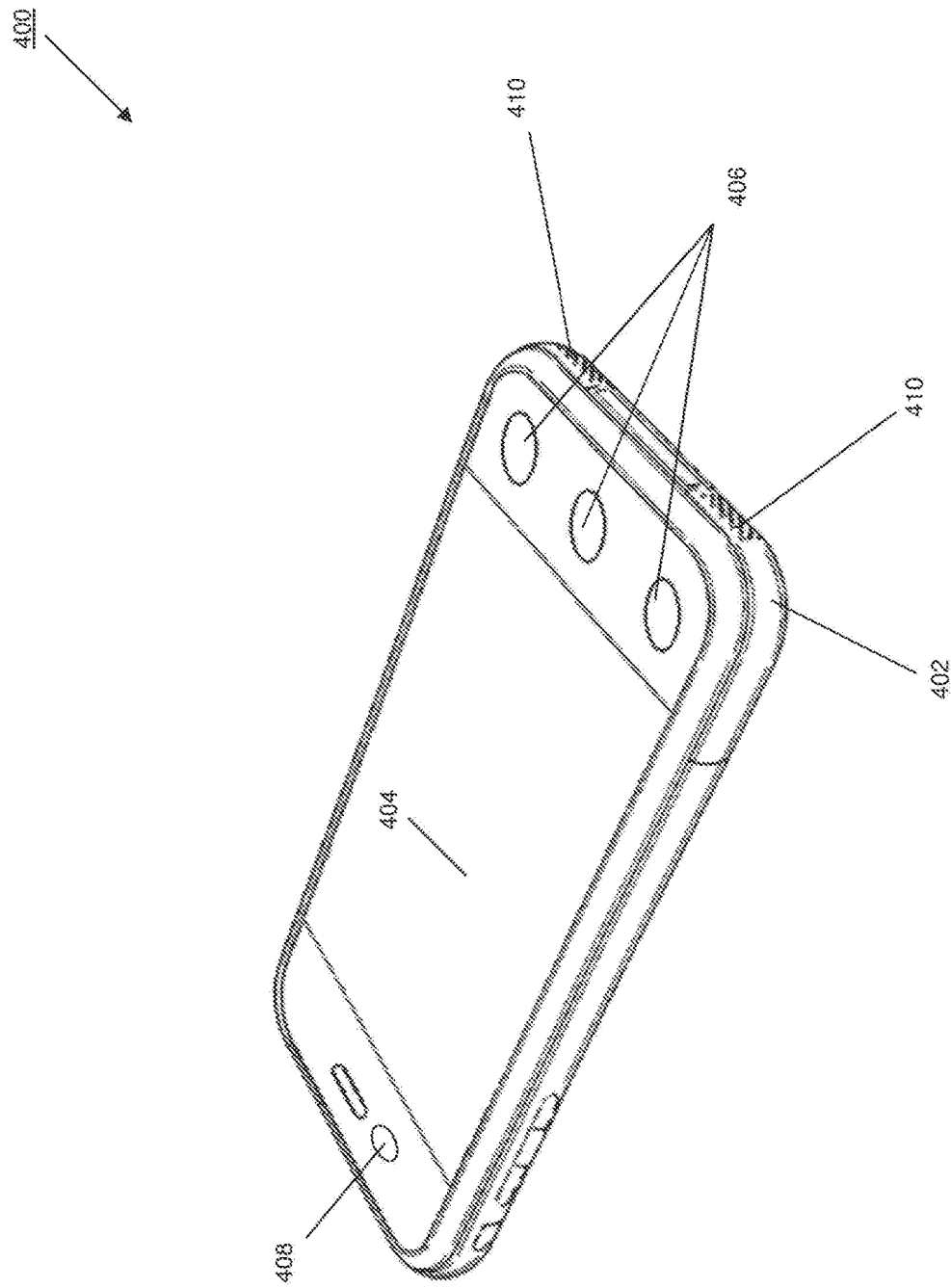
FIG. 4 is a perspective view illustrating an embodiment of a payer device.

Referring now to FIG. 4, an embodiment of a payer device 400 is illustrated. The payer device 400 may be the payer devices 200 and/or 302. The payer device 400 includes a chassis 402 having a display 404 and an input device including the display 404 and a plurality of input buttons 406. The payer device 400 further includes a camera 408 and one or more audio input/output devices (e.g., microphones, speakers) 410. One of skill in the art will recognize that the payer device 400 is a portable or mobile phone including a touch screen input device and a plurality of input buttons that allow the functionality discussed above with reference to the method 100. However, a variety of other portable/mobile payer devices and/or desktop payer devices may be used in the method 100 without departing from the scope of the present disclosure.

Figure 5:
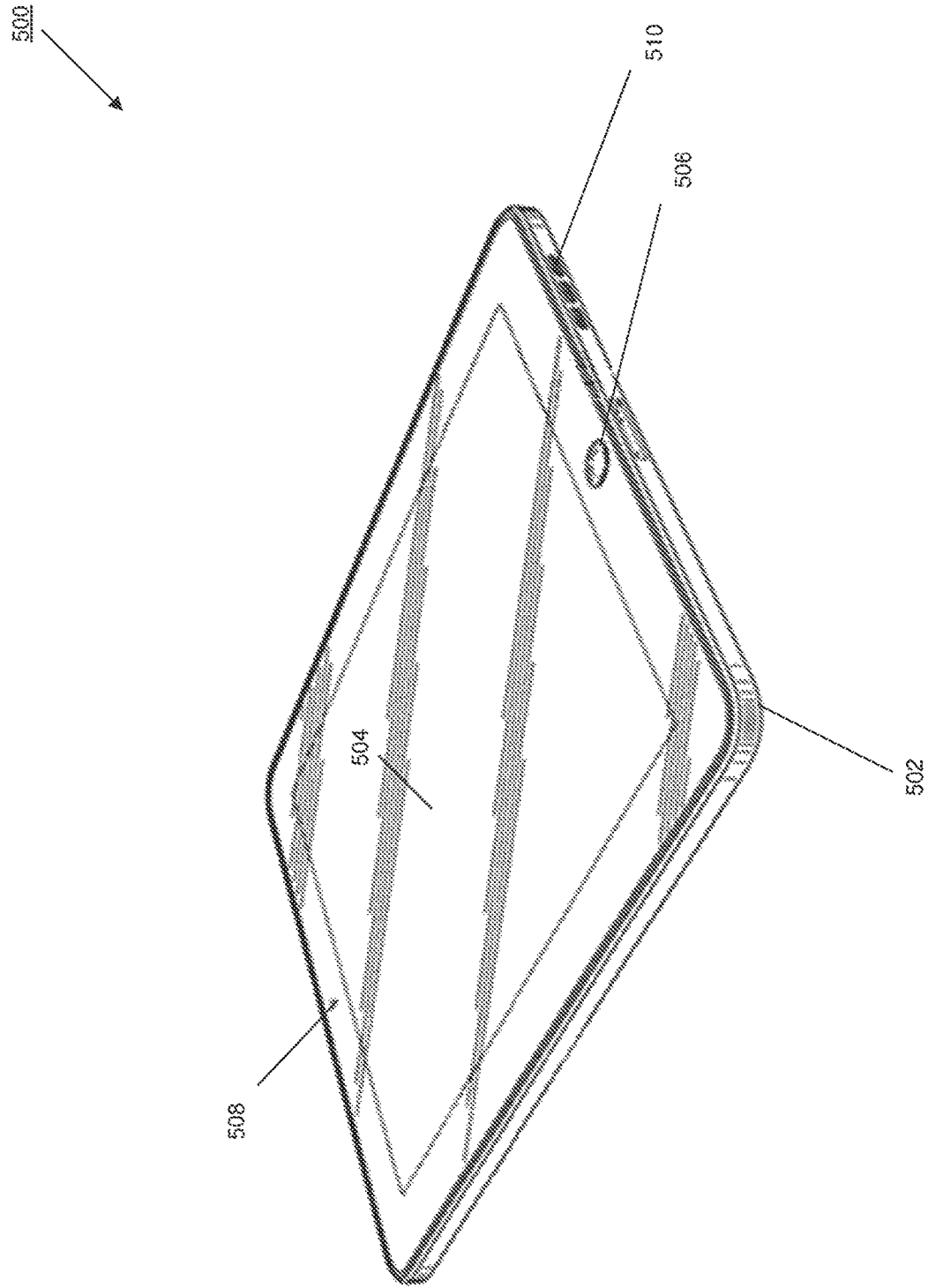
FIG. 5 is a perspective view illustrating a further embodiment of a payer device.

Referring now to FIG. 5, a further embodiment of a payer device 500 is illustrated. The payer device 400 may be the payer devices 200 and/or 302. The payer device 500 includes a chassis 502 having a display 504 and an input device including the display 504. The payer device 500 may also include an input button 406 and one or more audio input/output device 508 (e.g. microphones, speakers). One of skill in the art will recognize that the payer device 500 is a portable or mobile table device including a touch screen input device and a plurality of input buttons that allow the functionality discussed above with reference to the method 100. However, a variety of other portable/mobile payer devices and/or desktop payer devices may be used in the method 100 without departing from the scope of the present disclosure.

Figure 6:
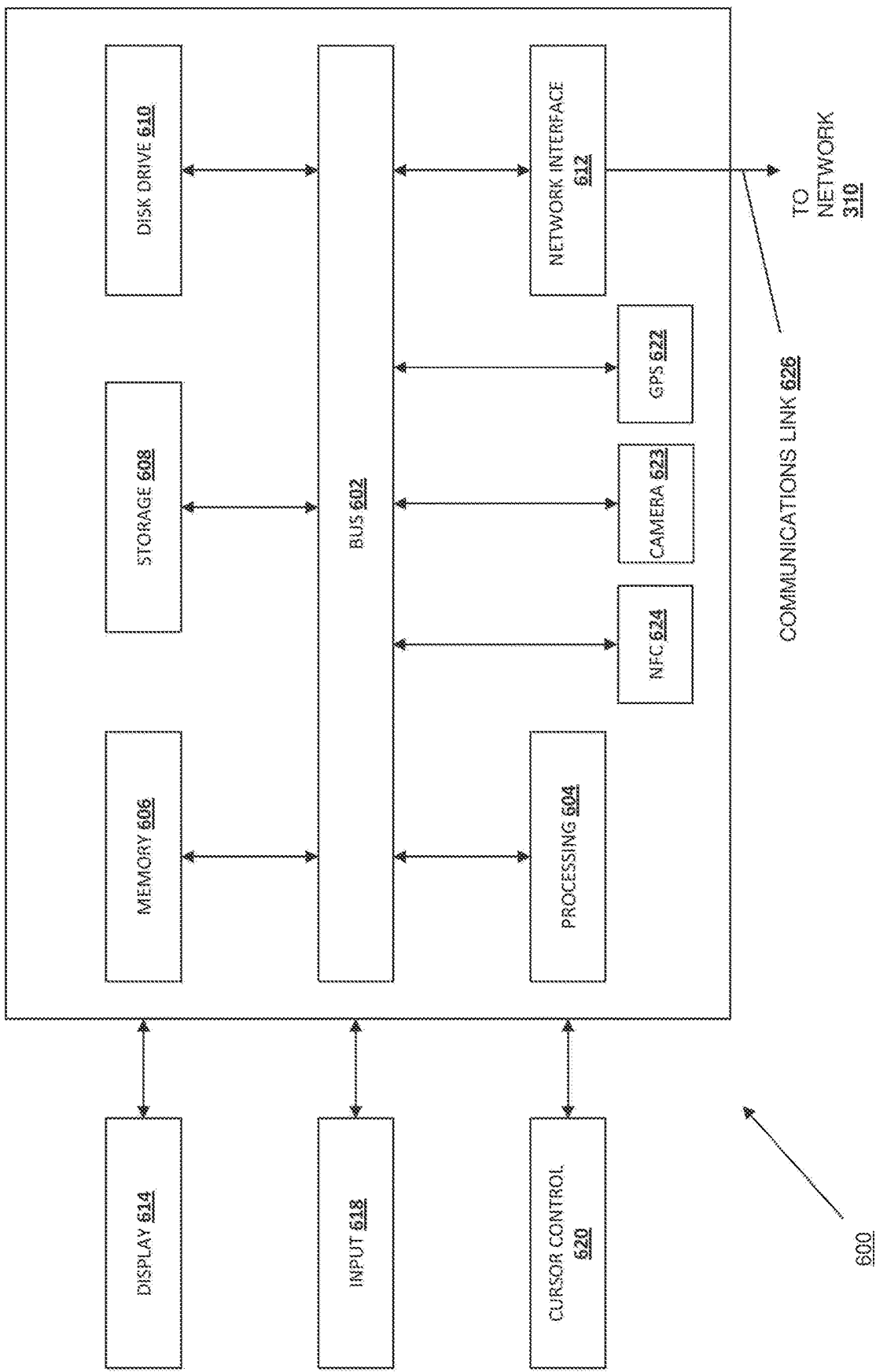
FIG. 6 is a schematic view illustrating an embodiment of a computer system.

Referring now to FIG. 6, an embodiment of a computer system 600 suitable for implementing, for example, the payer device 200, the payer device 302, the payer device 400, the payer device 500, the merchant devices 304, the payment services provider device 306, the account provider device 307, and/or the system provider device 308, is illustrated. It should be appreciated that other devices utilized by payers, merchants, payment services providers, account providers, and system providers in the system discussed above may be implemented as the computer system 600 in a manner as follows.

In accordance with various embodiments of the present disclosure, computer system 600, such as a computer and/or a network server, includes a bus 602 or other communication mechanism for communicating information, which interconnects subsystems and components, such as a processing component 604 (e.g., processor, micro-controller, digital signal processor (DSP), etc.), a system memory component 606 (e.g., RAM), a static storage component 608 (e.g., ROM), a disk drive component 610 (e.g., magnetic or optical), a network interface component 612 (e.g., modem or Ethernet card), a display component 614 (e.g., CRT, LCD, touch-sensitive display device, etc.), an input component 618 (e.g., keyboard, keypad, virtual keyboard, touch-sensitive display device), a cursor control component 620 (e.g., mouse, pointer, or trackball), a location determination component 622 (e.g., a Global Positioning System (GPS) device as illustrated, a cell tower triangulation device, a Wi-Fi triangulation device, a Bluetooth-based location device, and/or a variety of other location determination devices known in the art), and/or a camera device 623. The computer system 600 may also include a near-field communication (NFC) component 624, or other radio frequency identification component, installed therein allowing the device to be operated pursuant to ISO/IEC 18092, NFC IP-1 or the ISO/IEC 14443 contactless communication standards, or other applicable contactless communication standards and wireless technologies including but not limited to those for Bluetooth and Bluetooth Low Energy (BLE) and NFC. The computer system 600 may also include a magnetic stripe emulation device. In one implementation, the disk drive component 610 may comprise a database having one or more disk drive components. In one embodiment, voice recognition software and/or hardware may be used as an input component 618 and a cursor control component 620, and may also be used for output purposes (e.g., in addition to display component 614). For example, voice recognition software and/or hardware may cause a mobile device to transmit a personal account number, or may be used to select displayed graphical depictions of payment sources.

In accordance with embodiments of the present disclosure, the computer system 600 performs specific operations by the processor 604 executing one or more sequences of instructions contained in the memory component 606, such as described herein with respect to the payer devices 200, 302, 400 and 500, the merchant device(s) 304, the payment services provider device 306, the account provider device(s) 307, and/or the system provider device 308. Such instructions may be read into the system memory component 606 from another computer readable medium, such as the static storage component 608 or the disk drive component 610. In other embodiments, hard-wired circuitry may be used in place of or in combination with software instructions to implement the present disclosure.

Logic may be encoded in a computer readable medium, which may refer to any medium that participates in providing instructions to the processor 604 for execution. Such a medium may take many forms, including but not limited to, non-volatile media, volatile media, and transmission media. In one embodiment, the computer readable medium is non-transitory. In various implementations, non-volatile media includes optical or magnetic disks, such as the disk drive component 610, volatile media includes dynamic memory, such as the system memory component 606, and transmission media includes coaxial cables, copper wire, and fiber optics, including wires that comprise the bus 602. In one example, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read. In one embodiment, the computer readable media is non-transitory.

In various embodiments of the present disclosure, execution of instruction sequences to practice the present disclosure may be performed by the computer system 600. In various other embodiments of the present disclosure, a plurality of the computer systems 600 coupled by a communication link 626 to the network 310 (e.g., such as a LAN, WLAN, PTSN, and/or various other wired or wireless networks, including telecommunications, mobile, and cellular phone networks) may perform instruction sequences to practice the present disclosure in coordination with one another.

The computer system 600 may transmit and receive messages, data, information and instructions, including one or more programs (i.e., application code) through the communication link 626 and the network interface component 612. The network interface component 612 may include an antenna, either separate or integrated, to enable transmission and reception via the communication link 626. Received program code may be executed by processor 604 as received and/or stored in disk drive component 610 or some other non-volatile storage component for execution.

Figure 7:
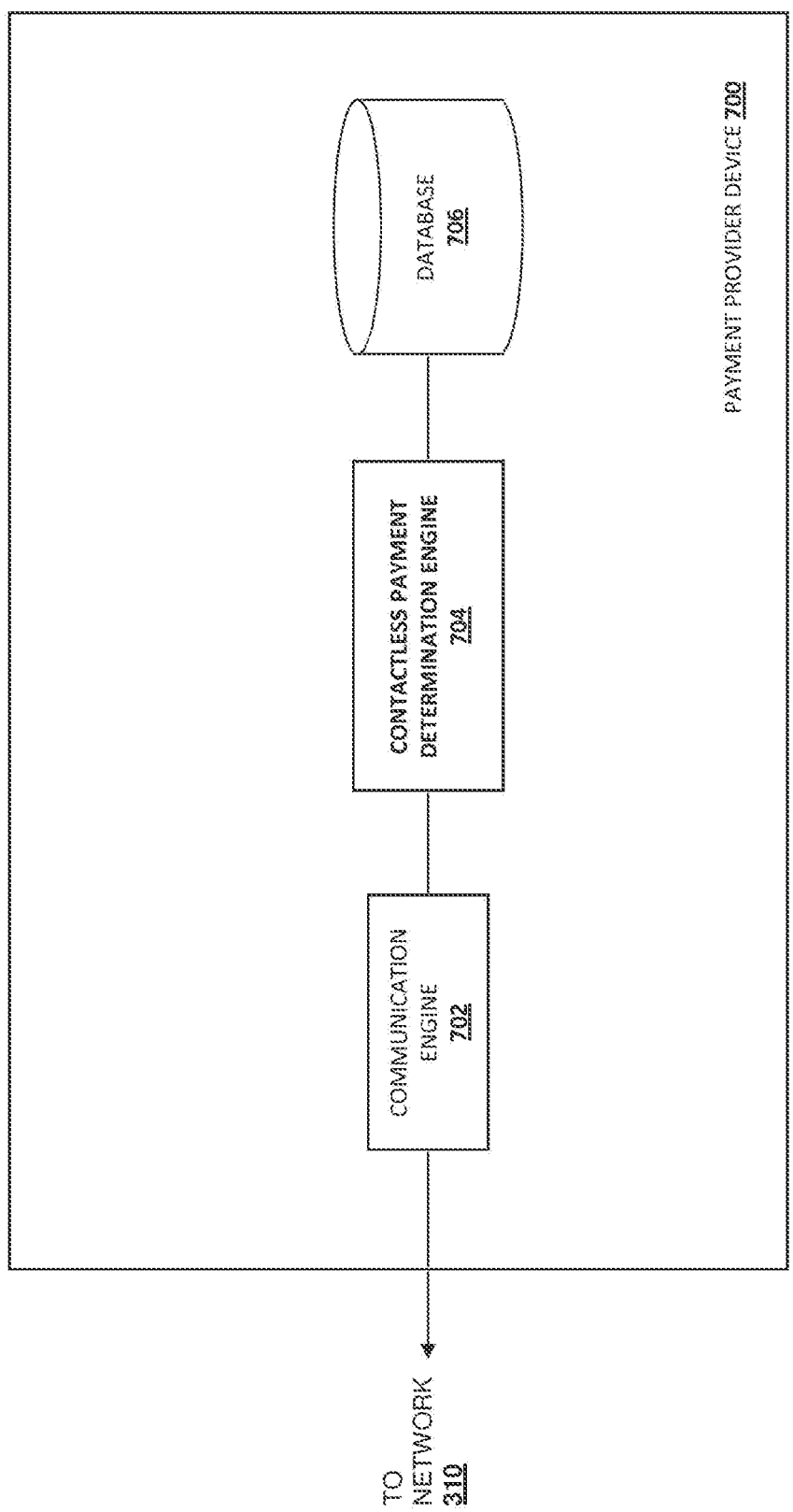
FIG. 7 is a schematic view illustrating an embodiment of a system provider device.

Referring now to FIG. 7, an embodiment of a payment provider device 700 is illustrated. In an embodiment, the device 700 may be the system provider device 308 discussed above. The device 700 includes a communication engine 702 that is coupled to the network 310 and to a contactless payment determination engine 704 that is coupled to a database 706. The communication engine 702 may be software or instructions stored on a computer-readable medium that allows the device 700 to send and receive information over the network 310. The contactless payment determination engine 704 may be software or instructions stored on a computer-readable medium that is operable to detect or receive a location of a mobile device using a location detection sensor, transmit or receive a detected location, identify a merchant corresponding to the detected location, determine whether the identified merchant has contactless payment options, and cause the display of graphical depictions of stored contactless payment options on a touch-sensitive display device of a mobile device. While the database 706 has been illustrated as located in the payment provider device 700, one of skill in the art will recognize that it may be connected to the contactless payment determination engine 704 through the network 310 without departing from the scope of the present disclosure.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the scope of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. For example, the above embodiments have focused on merchants and payers; however, a payer or consumer can pay, or otherwise interact with any type of recipient, including charities and individuals. The payment does not have to involve a purchase, but may be a loan, a charitable contribution, a gift, etc. Thus, payee as used herein can also include charities, individuals, and any other entity or person receiving a payment from a payer. Having thus described embodiments of the present disclosure, persons of ordinary skill in the art will recognize that changes may be made in form and detail without departing from the scope of the present disclosure. Thus, the present disclosure is limited only by the claims.

The invention claimed is:

1. A method, comprising:
monitoring, by one or more hardware processors at least in part via electronic signals from a user device of a user, a geographical position of the user device, wherein the electronic signals contain Global Positioning System (GPS) information, cellular communication information, Wi-Fi information, or Bluetooth information;
locating, by the one or more hardware processors, one or more business entities that are within a specified physical proximity from the geographical position of the user device;
determining, by the one or more hardware processors, one or more first payment options supported by the one or more business entities;
determining, by the one or more hardware processors, one or more second payment options associated with the user device;
causing, by the one or more hardware processors, a display, via a user interface of the user device, of one or more third payment options that match both a subset of the one or more first payment options and a subset of the one or more second payment options;

generating, by the one or more hardware processors based on a determination that a particular one of the one or more third payment options has been selected by the user, a machine-readable code that comprises payment information corresponding to the particular one of the one or more third payment options that is usable to complete a transaction with the one or more business entities;

causing, by the one or more hardware processors, a display of the machine-readable code via the user interface of the user device;

determining, by the one or more hardware processors based on the monitoring and after the one or more third payment options have been displayed via the user interface, that the one or more business entities are no longer within the specified physical proximity of the geographical position of the user device; and causing, by the one or more hardware processors and based on the determining that the one or more business entities are no longer within the specified physical proximity of the geographical position of the user device, the user interface to automatically remove the display of the one or more third payment options or the machine-readable code.

2. The method of claim 1, wherein at least a subset of the one or more third payment options are associated with one or more promotions offered by the one or more business entities.

3. The method of claim 1, wherein:
the one or more first payment options includes a plurality of first payment options;
each of the first payment options in the plurality of first payment options is displayed via the user interface of the user device; and
the one or more third payment options are displayed with a graphical emphasis among the plurality of first payment options.

4. The method of claim 3, wherein the graphical emphasis comprises displaying the one or more third payment options with an outline or placing the one or more third payment options first in order.

5. The method of claim 1, wherein the one or more third payment options are displayed without displaying:
a rest of the one or more first payment options that do not match any of the second payment options; or
a rest of the one or more second payment options that do not match any of the first payment options.

6. The method of claim 1, wherein the one or more first payment options are payment options that do not require a physical swipe of a payment card at a payment terminal of the one or more business entities.

7. The method of claim 1, wherein the locating comprises locating a plurality of business entities, and wherein the method further comprises:
causing a prompt to be displayed via the user interface of the user device, the prompt containing a plurality of selection options that correspond to a first business entities of the plurality of business entities, respectively; and
receiving a user input corresponding to one of the selection options of the prompt,
wherein the one or more third payment options match both the subset of the one or more first payment options of the first business entity and a subset of the one or more second payment options.

8. The method of claim 1, wherein the one or more third payment options comprises one or more contactless payment options.

9. The method of claim 1, wherein the machine-readable code is a single-use code.

10. The method of claim 9, further comprising:
activating, based on a determination that the particular one of the one or more third payment options has been selected by the user, an NFC transceiver of the user device.

11. The method of claim 9, wherein the machine-readable code comprises a barcode.

12. The method of claim 1, further comprising:
activating, based on a determination that the particular one of the one or more third payment options has been selected by the user, a magnetic stripe emulator in the user device.

13. A system, comprising:
one or more hardware processors; and
a non-transitory memory having stored thereon instructions that are executable by the one or more hardware processors to perform operations comprising:
monitoring, at least in part via electronic signals from a user device of a user, a geographical position of the user device, wherein the electronic signals contain Global Positioning System (GPS) information, cellular communication information, Wi-Fi information, or Bluetooth information;
locating one or more business entities that are within a specified physical proximity from the geographical position of the user device;
determining one or more first payment options supported by the one or more business entities;
determining one or more second payment options associated with the user device;
causing, to be displayed via a user interface of the user device, one or more third payment options that match both a subset of the one or more first payment options and a subset of the one or more second payment options;
generating, based on a user-selection of a particular one of the one or more third payment options, a machine-readable code that comprises payment information associated with the particular one of the one or more third payment options, wherein the machine-readable code is displayable via the user interface;
determining, based on the monitoring and after the one or more third payment options have been displayed via the user interface, that the one or more business entities are no longer within the specified physical proximity of the geographical position of the user device; and
causing the user interface to automatically remove, based on the determining that the one or more business entities are no longer within the specified physical proximity of the geographical position of the user device, the display of the one or more third payment options.

14. The system of claim 13, wherein:
the one or more first payment options includes a plurality of first payment options;
each of the first payment options in the plurality of first payment options is displayed via the user interface of the user device; and
the one or more third payment options are displayed with a graphical emphasis among the plurality of first payment options.

15. The system of claim 13, wherein the machine-readable code comprises a single-user barcode.

16. The system of claim 13, wherein the one or more third payment options comprise one or more contactless payment options.

17. A non-transitory machine-readable medium having instructions stored thereon that are executable by one or more hardware processors to cause the one or more hardware processors to perform operations comprising:

> monitoring, at least in part via electronic signals from a user device of a user, a geographical position of the user device, wherein the electronic signals contain Global Positioning System (GPS) information, cellular communication information, Wi-Fi information, or Bluetooth information;
>
> locating one or more business entities that are within a specified physical proximity from the geographical position of the user device;
>
> determining one or more first payment options supported by the one or more business entities;
>
> determining one or more second payment options associated with the user device;
>
> causing, to be displayed via a user interface of the user device, one or more third payment options that match both a subset of the one or more first payment options and a subset of the one or more second payment options;
>
> determining that a particular one of the one or more third payment options has been selected via an input with respect to the user interface;
>
> generating, based on the selected particular one of the one or more third payment options, a machine-readable code usable to conduct a transaction with the one or more business entities, the machine-readable code displayable via the user interface and comprising payment information associated with the particular one of the one or more third payment options;
>
> determining, based on the monitoring and after the one or more third payment options have been displayed via the user interface, that the one or more business entities are no longer within the specified physical proximity of the geographical position of the user device; and
>
> causing, based on the determining that the one or more business entities are no longer within the specified physical proximity of the geographical position of the user device, an automatic removal of at least one of the one or more third payment options or the machine-readable code from the user interface.

18. The non-transitory machine-readable medium of claim 17, wherein the machine-readable code comprises a single user barcode.

19. The non-transitory machine-readable medium of claim 17, wherein the operations further comprise:

> activating, based on the determining that the particular one of the one or more third payment options has been selected, an NFC transceiver of the user device or a magnetic stripe emulator in the user device.

* * * * *